(12) United States Patent
Kitamura et al.

(10) Patent No.: US 8,836,234 B2
(45) Date of Patent: Sep. 16, 2014

(54) POWER SUPPLY FOR LIGHTING AND LUMINAIRE

(75) Inventors: Noriyuki Kitamura, Kanagawa-ken (JP); Hirokazu Otake, Kanagawa-ken (JP); Yuji Takahashi, Kanagawa-ken (JP)

(73) Assignee: Toshiba Lighting & Technology Corporation, Kanagawa (JP)

( * ) Notice: Subject to any disclaimer, the term of this patent is extended or adjusted under 35 U.S.C. 154(b) by 138 days.

(21) Appl. No.: 13/533,667

(22) Filed: Jun. 26, 2012

(65) Prior Publication Data

US 2013/0234616 A1    Sep. 12, 2013

(30) Foreign Application Priority Data

Mar. 12, 2012 (JP) ................. 2012-055051

(51) Int. Cl.
*H05B 37/02* (2006.01)
(52) U.S. Cl.
USPC ............................ 315/291; 315/299; 315/307
(58) Field of Classification Search
USPC ............. 315/200 R, 205, 247, 291, 297, 299, 315/302, 307, 308
See application file for complete search history.

(56) References Cited

U.S. PATENT DOCUMENTS

| 7,855,520 | B2 * | 12/2010 | Leng | 315/307 |
| 8,134,304 | B2 * | 3/2012 | Hsu et al. | 315/291 |
| 2006/0261754 | A1 * | 11/2006 | Lee | 315/291 |
| 2007/0182347 | A1 | 8/2007 | Shteynberg et al. | |
| 2008/0203946 | A1 * | 8/2008 | Ito et al. | 315/307 |
| 2010/0225251 | A1 | 9/2010 | Maruyama | |
| 2011/0234115 | A1 | 9/2011 | Shimizu et al. | |
| 2012/0299501 | A1 * | 11/2012 | Kost et al. | 315/224 |
| 2012/0319604 | A1 * | 12/2012 | Walters | 315/200 R |

FOREIGN PATENT DOCUMENTS

| JP | 2007-538378 | 12/2007 |
| WO | WO-2005/115058 | 12/2005 |
| WO | 2008/029108 | 3/2008 |
| WO | 2011/063205 | 5/2011 |

OTHER PUBLICATIONS

European Search Report filed in European counterpart Application No. 12173729.0 dated Oct. 1, 2012 (7 pages).

* cited by examiner

*Primary Examiner* — Tung X Le
(74) *Attorney, Agent, or Firm* — Patterson & Sheridan LLP

(57) ABSTRACT

According to one embodiment, a power supply for lighting includes a rectifying circuit, a smoothing capacitor, and a current control circuit. The rectifying circuit rectifies a phase-controlled alternating-current voltage supplied to between a pair of input terminals. The smoothing capacitor is connected to a high-potential terminal and a low-potential terminal of the rectifying circuit. A first electric current flows to the current control circuit in a period when an absolute value of the alternating-current voltage is lower than a specified value. After a second electric current larger than the first electric current flows when the absolute value of the alternating-current voltage increases to be equal to or larger than the specified value, the current control circuit is shut off to reduce a current value to be smaller than the second electric current until the absolute value of the alternating-current voltage decreases to be lower than the specified value.

15 Claims, 6 Drawing Sheets

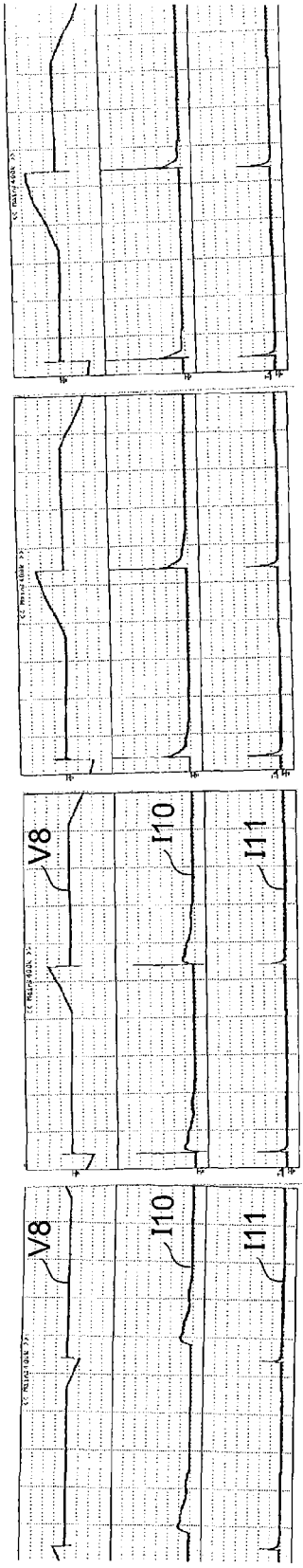
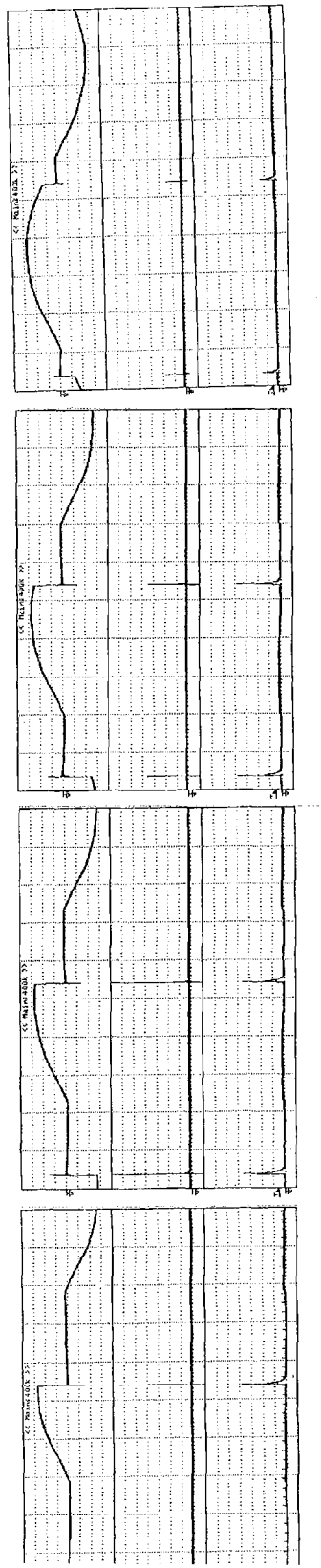
FIG. 3A  FIG. 3B  FIG. 3C  FIG. 3D
FIG. 3E  FIG. 3F  FIG. 3G  FIG. 3H

POWER SUPPLY FOR LIGHTING AND LUMINAIRE

CROSS-REFERENCE TO RELATED APPLICATIONS

This application is based upon and claims the benefit of priority from the prior Japanese Patent Application No. 2012-055051, filed on Mar. 12, 2012; the entire contents of which are incorporated herein by reference.

FIELD

Embodiments described herein relate generally to a power supply for lighting and a luminaire.

BACKGROUND

In recent years, in a luminaire, an incandescent lamp and a fluorescent lamp used as an illumination light source are replaced with a light source that consumes less energy and has longer life such as a light-emitting diode (LED). For example, new illumination light sources such as an electro-luminescence (EL) and an organic light-emitting diode (OLED) are also developed.

A two-wire dimmer is configured to control a phase in which a triac is turned on. The two-wire dimmer is spread as a dimmer for the incandescent lamp. Therefore, it is desirable that the illumination light sources such as the LED can be dimmed by the dimmer.

It is an object of the present invention to provide a power supply for lighting and a luminaire that can continuously change an output current using a dimmer that performs phase control.

DESCRIPTION OF THE DRAWINGS

FIGS. 3A to 3H are waveform charts illustrating dependency on phase control of main signals of the power supply for lighting;

FIGS. 4A and 4B are waveform charts illustrating the main signals of the power supply for lighting, wherein FIG. 4A is a comparative example and FIG. 4B is the embodiment;

DETAILED DESCRIPTION

Figure 1:
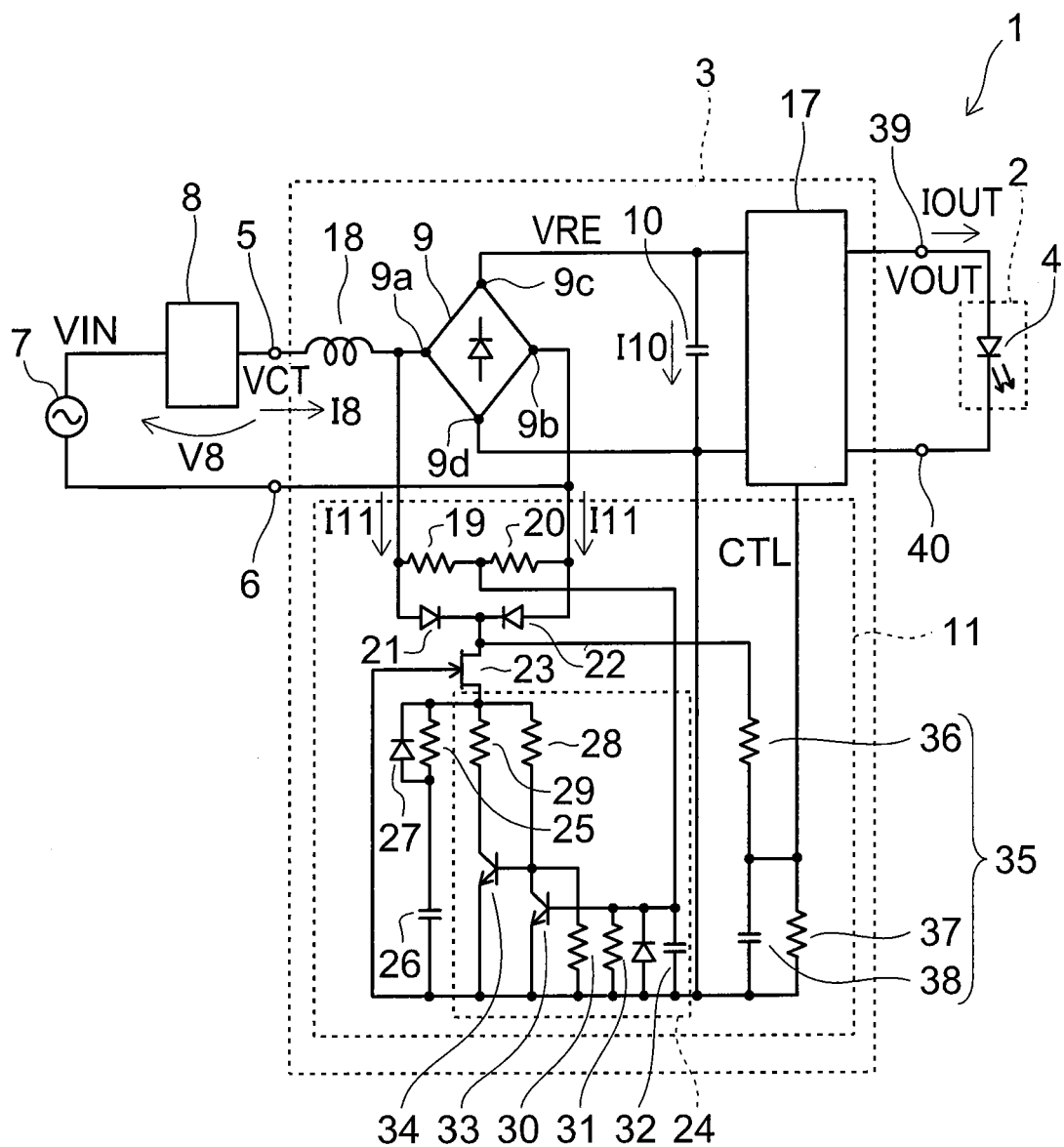
FIG. 1 is a circuit diagram illustrating a luminaire including a power supply for lighting according to a first embodiment.

In general, according to one embodiment, a power supply for lighting includes' a rectifying circuit, a smoothing capacitor, and a current control circuit. The rectifying circuit rectifies a phase-controlled alternating-current voltage supplied to between a pair of input terminals. The smoothing capacitor is connected to a high-potential terminal and a low-potential terminal, which are a pair of output terminals, of the rectifying circuit. The current control circuit is connected to the pair of input terminals. A first electric current flows to the current control circuit in a period when an absolute value of the alternating-current voltage is lower than a specified value. After a second electric current larger than the first electric current flows when the absolute value of the alternating-current voltage increases to be equal to or larger than the specified value, the current control circuit is shut off to reduce a current value to be smaller than the second electric current until the absolute value of the alternating-current voltage decreases to be lower than the specified value.

In general, according to another embodiment, a luminaire includes a lighting load and a power supply for lighting. The power supply for lighting includes a rectifying circuit, a smoothing capacitor, and a current control circuit and supplies an electric current to the lighting load. The rectifying circuit rectifies a phase-controlled alternating-current voltage supplied to between a pair of input terminals. The smoothing capacitor is connected to a high-potential terminal and a low-potential terminal, which are a pair of output terminals, of the rectifying circuit. The current control circuit is connected to the pair of input terminals. A first electric current flows in a period when an absolute value of the alternating-current voltage is lower than a specified value. After a second electric current larger than the first electric current flows when the absolute value of the alternating-current voltage increases to be equal to or larger than the specified value, the current control circuit is shut off to reduce a current value to be smaller than the second electric current until the absolute value of the alternating-current voltage decreases to be lower than the specified value.

Embodiments are explained below in detail with reference to the accompanying drawings. In this specification and the figures, components same as those explained concerning the figures already referred to are denoted by the same reference numerals and signs and detailed explanation of the components is omitted as appropriate.

First Embodiment

FIG. 1 is a circuit diagram illustrating a luminaire including a power supply for lighting according to a first embodiment.

A luminaire 1 according to the first embodiment includes a lighting load 2 and a power supply for lighting 3 that supplies electric power to the lighting load 2.

The lighting load 2 includes an illumination light source 4 such as an LED. The lighting load 2 is supplied with an output voltage VOUT and an output current IOUT from the power supply for lighting 3 and turned on. The lighting load 2 can change at least one of the output voltage VOUT and the output current IOUT and perform dimming.

The power supply for lighting 3 is connected to an alternating-current power supply 7 via a dimmer 8. The power supply for lighting 3 converts a phase-controlled alternating-current voltage VCT input to a pair of input terminals 5 and 6 and outputs an output voltage VOUT to a pair of output terminals 39 and 40. The alternating-current power supply 7 is, for example, a commercial power supply. In this embodiment, a configuration in which the dimmer 8 is inserted in series into one of a pair of power supply lines for supplying a power supply voltage VIN is illustrated. However, the dimmer 8 may adopt other configurations.

Figure 2:
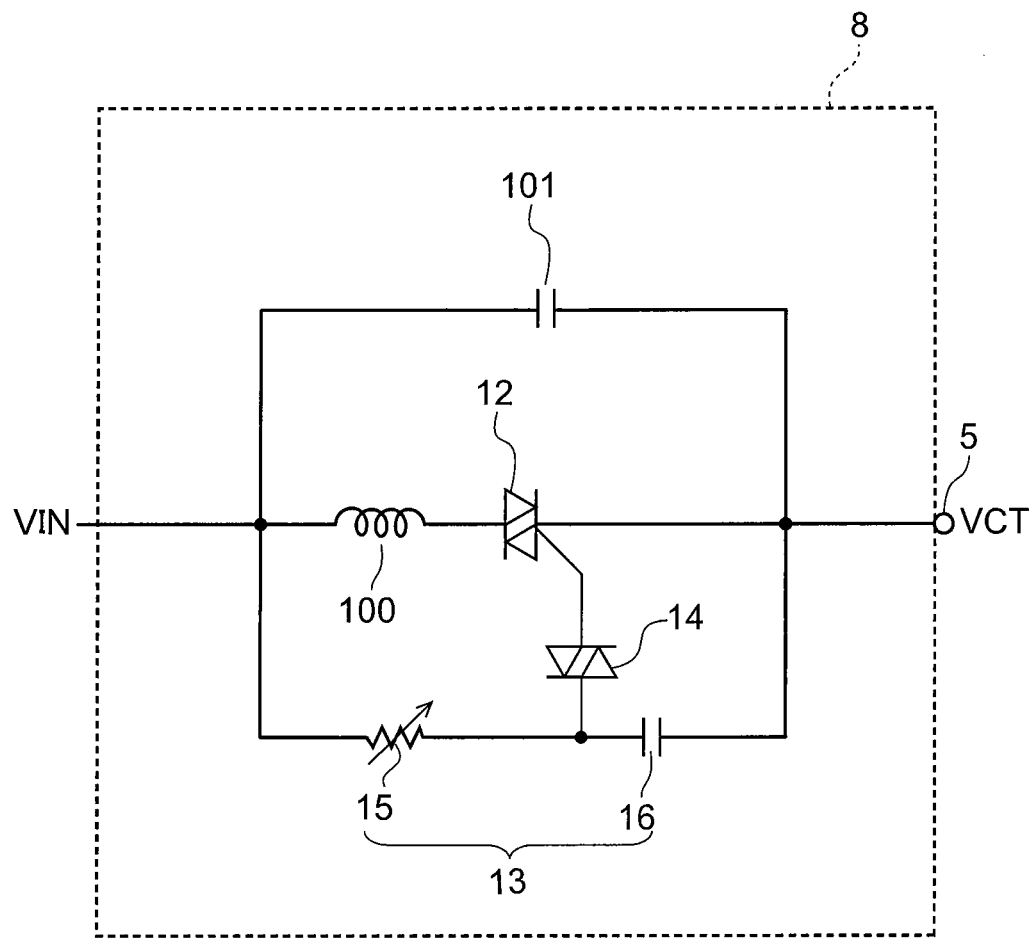
FIG. 2 is a circuit diagram illustrating a dimmer.

FIG. 2 is a circuit diagram illustrating the dimmer.

The dimmer 8 includes a triac 12 inserted in series into a power supply line, an inductor 100 connected in series to the triac 12, a phase circuit 13 connected in parallel to a series circuit of the triac 12 and the inductor 100, a DIAC 14 connected between a gate of the triac 12 and the phase circuit 13, and a filter capacitor 101 connected in parallel to a series circuit of the triac 12 and the inductor 100.

The triac 12 is usually in a state in which main electrodes are shut off. When a pulse signal is input to the gate, the triac 12 conducts. The triac 12 can feed an electric current in both directions, i.e., when the alternating-current power supply voltage VIN has positive polarity and when the alternating-current power supply voltage VIN has negative polarity.

The phase circuit 13 includes a variable resistor 15 and a timing capacitor 16 and generates phase-delayed voltages at both ends of the timing capacitor 16. When the resistance of the variable resistor 15 is changed, a time constant changes and a delay time changes.

When a voltage charged in the capacitor of the phase circuit 13 exceeds a fixed value, the DIAC 14 generates a pulse voltage and causes the triac 12 to conduct.

Timing when the triac 12 conducts can be adjusted by changing the time constant of the phase circuit 13 and controlling timing when the DIAC 14 generates a pulse. Therefore, the dimmer 8 can adjust a conduction period of phase control in the alternating-current voltage VCT.

The inductor 100 reduces a rate of change di/dt of an electric current i in order to prevent breaking of the triac 12. The filter capacitor 101 is provided as a filter for the inductor 100 to prevent noise.

Referring back to FIG. 1, the power supply for lighting 3 includes a rectifying circuit 9, a smoothing capacitor 10, a current control circuit 11, a direct-current power supply circuit 17, and a choke coil 18.

The rectifying circuit 9 includes a diode bridge. Input terminals 9a and 9b of the rectifying circuit 9 are connected to the pair of input terminals 5 and 6 via the choke coil 18. The alternating-current voltage VCT phase-controlled via the dimmer 8 is input to the input terminals 9a and 9b of the rectifying circuit 9.

The smoothing capacitor 10 is connected to a high-potential terminal 9c and a low-potential terminal 9d of the rectifying circuit 9. A smoothed direct-current voltage VRE is generated at both ends of the smoothing capacitor 10. The rectifying circuit 9 only has to be capable of rectifying the alternating-current voltage VCT input from the dimmer 8 and may adopt other configurations.

The current control circuit 11 includes a pair of resistors 19 and 20, a pair of rectifying elements 21 and 22, a switching element 23, a detecting circuit 24, a charging resistor 25, a charging capacitor 26, and a reference-voltage generating circuit 35.

The pair of resistors 19 and 20 are connected in series to the pair of input terminals 5 and 6 via the choke coil 18. The pair of rectifying elements 21 and 22 are, for example, diodes and connected in series to the pair of input terminals 5 and 6 via the choke coil 18 in a direction of reverse conduction in which anodes of the respective rectifying elements 21 and 22 are connected to the pair of input terminals 5 and 6. The resistance of the resistor 19 and the resistance of the resistor 20 are set equal.

The switching element 23 is, for example, an FET and is, for example, a GaN-HEMT and a normally-on type element. A drain of the switching element 23 is connected to a cathode of the rectifying element 21 and a cathode of the rectifying element 22. A source of the switching element 23 is connected to the low-potential terminal 9d of the rectifying circuit 9 via the detecting circuit 24. A gate of the switching element 23 is connected to the low-potential terminal 9d.

The detecting circuit 24 is connected between the switching element 23 and the low-potential terminal 9d of the rectifying circuit 9. The detecting circuit 24 includes resistors 28, 29, 30, and 31, a detection capacitor 32, and transistors 33 and 34. The detecting circuit 24 is connected to the pair of input terminals 5 and 6 via the pair of resistors 19 and 20 and configured to be symmetrical to the pair of input terminals 5 and 6.

The transistor 33 is an NPN transistor. A collector of the transistor 33 is connected to the source of the switching element 23 via the resistor 28 and connected to the low-potential terminal 9d of the rectifying circuit 9 via the resistor 30. An emitter of the transistor 33 is connected to the low-potential terminal 9d. A base of the transistor 33 is connected to a connection point of the pair of resistors 19 and 20. The resistor 31 and the detection capacitor 32 are connected between the base of the transistor 33 and the low-potential terminal 9d. The resistance of the resistor 28 is set smaller than the resistance of the resistor 29. The resistance of the resistor 31 is set smaller than the resistance of the resistors 19 and 20. A protection diode is connected to the base of the transistor 33.

The transistor 34 is an NPN transistor. A collector of the transistor 34 is connected to the source of the switching element 23 via the resistor 29. An emitter of the transistor 34 is connected to the low-potential terminal 9d. A base of the transistor 34 is connected to the collector of the transistor 33.

The charging resistor 25 and the charging capacitor 26 are connected in series between the source of the switching element 23 and the low-potential terminal 9d of the rectifying circuit 9. A diode 27 is connected in parallel to the charging resistor 25 and with a forward direction set in the direction from the low-potential terminal 9d to the source of the switching element 23.

The reference-voltage generating circuit 35 is connected between the drain of the switching element 23 and the low-potential terminal 9d of the rectifying circuit 9. The reference-voltage generating circuit 35 includes resistors 36 and 37 and a capacitor 38. The resistor 36 and the capacitor 38 are connected in series between the drain of the switching element 23 and the low-potential terminal 9d. The resistor is connected in parallel to the capacitor 38. The reference-voltage generating circuit 35 smoothes a drain voltage of the switching element 23 using the resistor 36 and the capacitor 38 and outputs the drain voltage to the direct-current power supply circuit 17 as a reference voltage CTL. A time constant of the resistor 36 and the capacitor 38 is set to a sufficiently large value with respect to the period of the power supply voltage VIN. The reference voltage CTL is set lower than the power supply voltage VIN of the alternating-current power supply 7 in a phase in which the dimmer 8 conducts.

The direct-current power supply circuit 17 is a circuit that converts the direct-current voltage VRE smoothed by the smoothing capacitor 10 into the output voltage VOUT. The direct-current power supply circuit 17 only has to be capable of outputting the output voltage VOUT on the basis of the reference voltage CTL and can adopt an arbitrary circuit configuration.

The operation of the power supply for lighting 3 is explained.

FIGS. 3A to 3H are waveform charts illustrating dependency on phase control of main signals of the power supply for lighting.

In FIGS. 3A to 3H, a voltage V8 at both the ends of the dimmer 8, an electric current I10 for charging the smoothing capacitor 10, and an electric current I11 flowing to the current control circuit 11 are shown. A conduction period of the phase control by the dimmer 8 is longer in the order of FIGS. 3A to 3H. A combined current of the electric current I10 and the electric current I11 is an input current I8 to the power supply for lighting 3.

The alternating-current power supply 7 is a commercial power supply having a frequency 50 Hz and a voltage 100 V. In a period after the power supply voltage VIN of the alternating-current power supply 7 crosses zero and the polarity of the power supply voltage VIN is reversed until an absolute value of the power supply voltage VIN increases and the dimmer 8 conducts, the dimmer 8 is in a shut-off state. The impedance of the dimmer 8 is high compared with the input impedance of the power supply for lighting 3. The power supply voltage VIN is applied to both the ends of the dimmer 8. The voltage V8 at both the ends of the dimmer 8 changes according to the voltage of the power supply voltage VIN (V8 in FIGS. 3A to 3H).

For example, it is assumed that the power supply voltage VIN is in a phase in which the input terminal 5 side is set to positive polarity and the input terminal 6 side is set to negative polarity. The alternating-current voltage VCT phase-controlled by the dimmer 8 is supplied to the drain of the switching element 23 via the rectifying element 21. Since the switching element 23 is the normally-on type element, the switching element 23 is on.

The rectifying element 22 is in a shut-off state. The voltage at both ends of the resistor 20 is higher than the voltage at both ends of the resistor 31 connected between the base and the emitter of the transistor 33. As a result, the rectifying circuit 9 is in a conduction state between the input terminal 9b and the low-potential terminal 9d.

An absolute value of the alternating-current voltage VCT input to the input terminals 5 and 6 of the power supply for lighting 3 is relatively small. A base voltage of the transistor 33 obtained by dividing the alternating-current voltage VCT between the resistor 19 and the resistor 31 is lower than a forward direction voltage between the base and the emitter of the transistor 33. As a result, the transistor 33 is off. Since the transistor 33 is off, the transistor 34 is biased by the resistor 28 and the resistor 30 and turned on. As a result, a first electric current flows to the current control circuit 11 through a path of the rectifying element 21, the switching element 23, the resistor 29, and the transistor 34 (I11 in FIGS. 3A to 3H). The current control circuit 11 has an ability of feeding an electric current, for example, equal to or larger than 20 mA as the first electric current and prevents a voltage from being generated by an electric current flowing via the filter capacitor 101 of the dimmer 8.

The input current I8 having magnitude equal to the magnitude of the first electric current flows to the power supply for lighting 3 through a path of the input terminal 5, the choke coil 18, the rectifying element 21, the switching element 23, the resistor 29, the transistor 34, the low-potential terminal 9d of the rectifying circuit 9, the input terminal 9b of the rectifying circuit 9, and the input terminal 6.

The charging capacitor 26 is charged via the charging resistor 25. A source voltage of the switching element 23 rises. However, the switching element 23 remains in the ON state.

Subsequently, when the dimmer 8 conducts, the impedance of the dimmer 8 drops below the input impedance of the power supply for lighting 3. The voltage V8 at both the ends of the dimmer 8 drops to nearly zero (V8 in FIGS. 3A to 3H). At this point, the alternating-current voltage VCT input to the input terminals 5 and 6 of the power supply for lighting 3 is substantially equal to the power supply voltage VIN.

The absolute value of the alternating-current voltage VCT input to the inter terminals 5 and 6 of the power supply for lighting 3 increases to be equal to or larger than a specified value and the drain voltage of the switching element suddenly rises. The base-to-emitter voltage of the transistor 33 of the detecting circuit 24 rises and the transistor 33 is turned on. As a result, the base-to-emitter voltage of the transistor 34 drops and the transistor 34 is turned off.

The specified value is a voltage at which the detecting circuit 24 detects a conduction state and a shut-off state of the alternating-current voltage VCT phase-controlled by the dimmer 8. When the absolute value of the alternating-current voltage VCT is smaller than the specified value, the detecting circuit 24 detects the shut-off state. When the absolute value of the alternating-current voltage VCT is equal to or larger than the specified value, the detecting circuit 24 detects the conduction state. The specified value is a voltage value of, for example, 15% of a maximum instantaneous value of the power supply voltage VIN of the alternating-current power supply 7. For example, when an effective value is 100 V, the specified value is set to 21 V as 15% of a maximum instantaneous value 141V.

The charging capacitor 26 is charged by a second electric current via the charging resistor 25. As a result, the source voltage of the switching element 23 rises. Since the gate of the switching element 23 is connected to the low-potential terminal 9d of the rectifying circuit 9, a gate-to-source voltage of the switching element 23 drops in the polarity of a negative voltage (an absolute value increases). When the gate-to-source voltage of the switching element 23 drops below a threshold voltage of the switching element 23, the switching element 23 is turned off. As a result, the second electric current for charging the charging capacitor 26 is shut off and flows as a pulse current (I11 in FIGS. 3A to 3H).

The input current I8 including the second electric current flows to the power supply for lighting 3 through a path of the input terminal 5, the choke coil 18, the rectifying element 21, the switching element 23, the charging resistor 25, the charging capacitor 26, the low-potential terminal 9d of the rectifying circuit 9, the input terminal 9b of the rectifying circuit 9, and the input terminal 6.

The absolute value of the alternating-current voltage VCT at this point increases from the absolute value at the time when the first electric current flows. Therefore, a peak value of the second electric current is larger than the first electric current.

Since the switching element 23 is turned off, an electric current stops flowing to the current control circuit 11. An electric current does not flow to the current control circuit 11 until the absolute value of the alternating-current voltage VCT decreases to be smaller than the specified value and crosses zero and the polarity of the alternating-current voltage VCT is reversed. The charging capacitor 26 discharges via the diode 27, the resistor 28, and the transistor 33.

When the dimmer 8 conducts and the absolute value of the alternating-current voltage VCT increases to be larger than the direct-current voltage VRE smoothed by the smoothing capacitor 10, the electric current I10 for charging the smoothing capacitor 10 flows (I10 in FIGS. 3A to 3H).

As explained above, the second electric current flows through the current control circuit 11 when the dimmer 8 conducts. The electric current I10 for charging the smoothing capacitor 10 flows when the dimmer 8 conducts and the absolute value of the alternating-current voltage VCT increases to be larger than the direct-current voltage VRE smoothed by the smoothing capacitor 10. As a result, a period when the second electric current flows and a period when the electric current I10 for charging the smoothing capacitor 10 flows do not always coincide with each other.

When the second electric current flows, energy is accumulated in the choke coil 18. When the second electric current finishes flowing, the energy accumulated in the choke coil 18 is discharged. As a result, an electric current does not flow in the conduction period of the dimmer 8 with the energy accumulated in the choke coil 18 and cause malfunction of the phase control of the dimmer 8. The same holds true when the electric current I10 for charging the smoothing capacitor 10 flows.

When the polarity of the alternating-current voltage VCT is reversed, the transistor 33 returns to the OFF state and the transistor 34 returns to the ON state. The same operation is repeated thereafter.

In the above explanation, the power supply voltage VIN is in the phase in which the input terminal 5 side is set to the positive polarity and the input terminal 6 side is set to the negative polarity. However, the operation of the current control circuit 11 performed when the polarity of the power supply voltage VIN is the reverse polarity is the same except that the operations of the resistors 19 and 20 and the operations of the rectifying elements 21 and 22 are respectively interchanged. The operation of the power supply for lighting 3 is the same as the above except that the input current I8 flows through a path of the input terminal 6, the current control circuit 11, the low-potential terminal 9d of the rectifying circuit 9, the input terminal 9a of the rectifying circuit 9, the choke coil 18, and the input terminal 5.

Figures 4A, 4B:
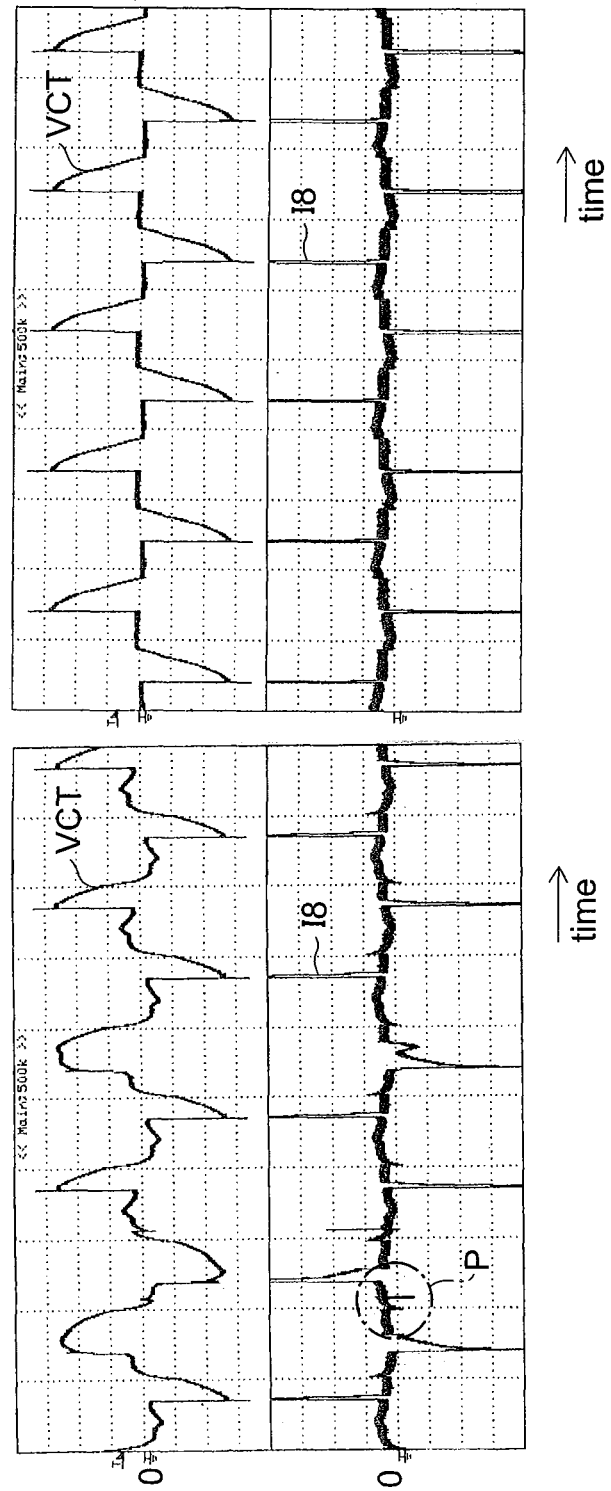

FIGS. 4A and 4B are waveform charts illustrating main signals of the power supply for lighting. FIG. 4A is a comparative example and FIG. 4B is the embodiment.

A power supply of the comparative example has a configuration in which the current control circuit 11 is excluded from the power supply for lighting 3 according to this embodiment. As shown in FIG. 4A, in the power supply of the comparative example, since the fixed first electric current does not flow to the current control circuit 11 in a period of the shut-off state of the dimmer 8, a period when the input current I8 flows at random in a pulse shape and a trigger phase of the dimmer 8 is unstable occurs (a portion surrounded by an alternate long and short dash line P of I8 in FIG. 4A). The phase-controlled alternating-current voltage VCT in the period of the shut-off state of the dimmer 8 has a relatively large voltage value that changes according to the power supply voltage VIN (VCT in FIG. 4A).

Further, in the power supply of the comparative example, in the conduction period of the dimmer 8, since the pulse-like second electric current does not flow to the current control circuit 11, the input current I8 flows when the smoothing capacitor 10 is charged. As a result, a phase in which the input current I8 flows and the magnitude of the input current I8 are unstable (I8 in FIG. 4A). Since the input current I8 is unstable, the phase-controlled alternating-current voltage VCT in a period of the conduction state of the dimmer 8 has a distorted waveform rather than a sine waveform.

On the other hand, as shown in FIG. 4B, the power supply for lighting 3 according to this embodiment can stabilize the input current I8 in the period of the shut-off state of the dimmer 8 to a first electric current value. Therefore, it is possible to reduce the phase-controlled alternating-current voltage VCT in the period of the shut-off state of the dimmer 8 to near zero (VCT in FIG. 4B). As a result, it is possible to stabilize the trigger phase of the dimmer 8 (I8 in FIG. 4B).

Further, when the dimmer 8 conducts, the second electric current flows to the current control circuit 11 as the input current I8. Thereafter, in the period of the conduction state of the dimmer 8, an electric current having magnitude for causing the dimmer 8 to conduct again does not flow to the current control circuit 11 as the input current I8 (I8 in FIG. 4B). As a result, the triac 12 is not turned on again. It is possible to change the phase-controlled alternating-current voltage VCT in the period of the conduction state of the dimmer 8 to a state close to a sine wave substantially equal to the power supply voltage VIN (VCT in FIG. 4B).

In general, in order to cause the triac 12 in the dimmer 8 to stably conduct, it is necessary to feed an electric current (a latching current) equal to or larger than a predetermined value. Since a filter such as the phase circuit 13 is included in the dimmer 8, after the conduction, the dimmer 8 is sometimes shut off because of commutation or the like. The shut-off of the dimmer 8 can be suppressed by an inductor, a capacitor, a resistor, and the like. However, the circuit is increased in size.

In the power supply for lighting 3 according to this embodiment, in a period when the absolute value of the phase-controlled alternating-current voltage VCT is relatively low, the first electric current flows to the current control circuit 11. Therefore, it is possible to stabilize the alternating-current voltage VCT in the shut-off state of the dimmer 8 near zero and stabilize the trigger phase of the dimmer 8.

When the absolute value of the alternating-current voltage VCT increases to be equal to or larger than the specified value, the second electric current larger than the first electric current continuously flows to the current control circuit 11 as a pulse current without a pause period. The electric current of the triac 12 is prevented from shifting to the negative polarity and changing to the shut-off state with the second electric current. Thereafter, the electric current I11 flowing to the current control circuit 11 is shut off to a current value smaller than the second electric current and not turning on the triac 12 again until the polarity of the alternating-current voltage VCT is reversed. Therefore, the conduction state of the dimmer 8 can be stabilized without fluctuating. As a result, the output current IOUT can be continuously changed by the phase-controlled dimmer 8. The luminaire 1 can be continuously dimmed by the dimmer 8.

The power supply for lighting 3 according to this embodiment detects the specified value of the alternating-current voltage VCT using a detecting circuit 24 of a system separate from the rectifying circuit 9 in which an allowable current is relatively large and a drop of a forward direction voltage is relatively large. As a result, compared with the detection of the alternating-current voltage VCT at the post stage of the rectifying circuit 9, since a rectifying diode is not included, there is no rectifying action, it is possible to detect a phase (zero cross) in which the polarity of an alternating-current voltage changes, set the specified value low, and reduce a loss. Since a loss can be reduced, it is possible to set the first and second electric currents relatively large and stabilize the operation of the dimmer 8.

The power supply for lighting 3 according to this embodiment detects the specified value of the alternating-current voltage VCT via the pair of resistors 19 and 20 and the pair of rectifying elements 21 and 22 symmetrically configured between the input terminals 5 and 6. Therefore, the power supply for lighting 3 can operate symmetrically to reversal of the polarity of the alternating-current voltage VCT.

Since a current value can be changed according to the resistances of the resistors 28 and 29 connected to the switching element 23, it is possible to obtain, with a simple configuration, the effects explained above.

Dimming can be performed by a low-frequency circuit without using a high-frequency circuit such as a chopper. Since the alternating-current voltage VCT before rectification by the rectifying circuit 9 is detected to cope with a dimming operation, an excess diode or the like is not inserted into a main circuit path including the rectifying circuit 9 and the direct-current power supply circuit 17. As a result, power efficiency is improved.

The voltage value of the drain voltage of the switching element 23 in the current control circuit clearly changes between the period of the conduction state of the dimmer 8 and the period of the shut-off state of the dimmer 8. Therefore, it is possible to easily generate the reference voltage CTL that reflects the phase angle of the dimmer 8.

Second Embodiment

Figure 5:
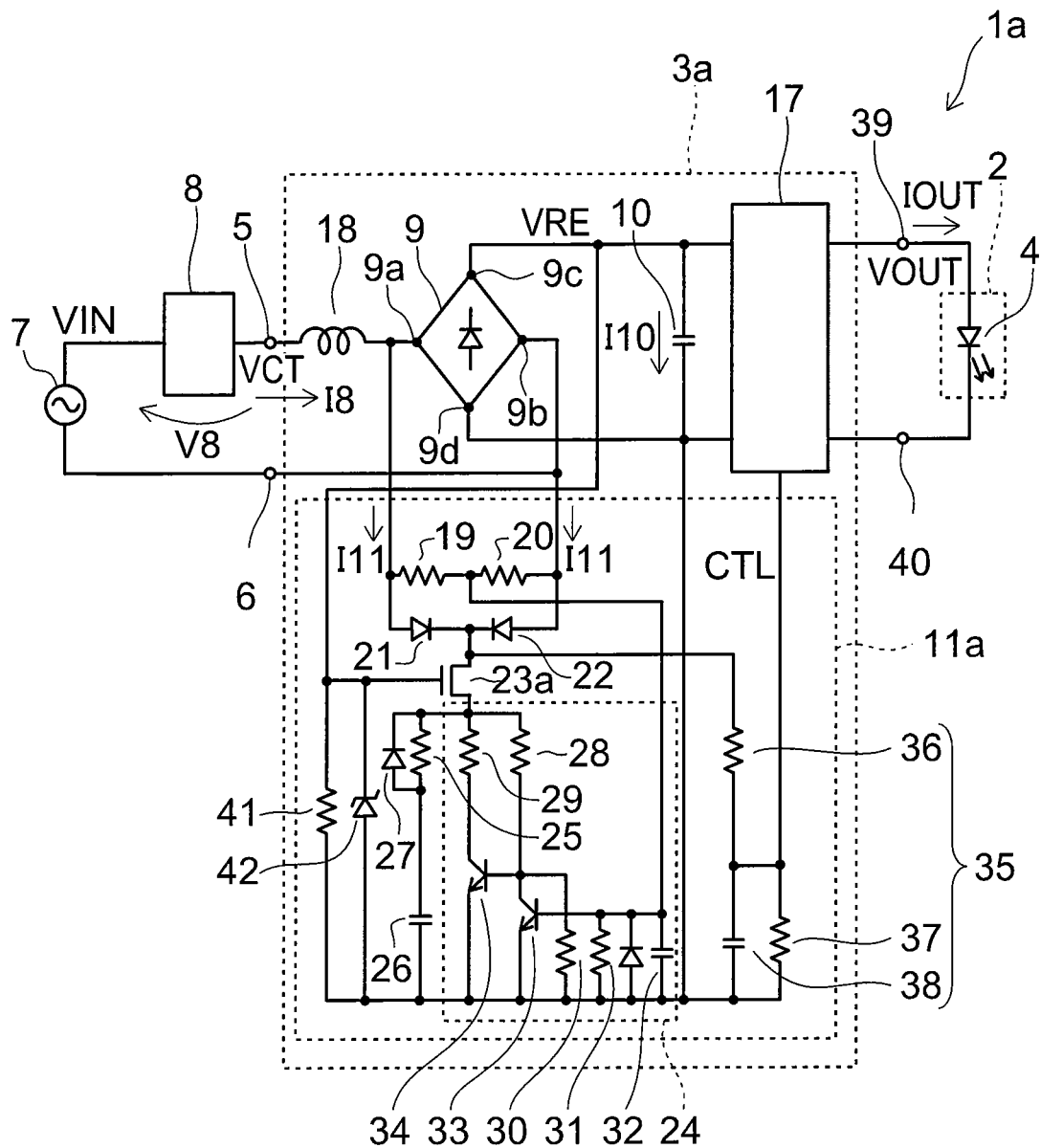
FIG. 5 is a circuit diagram illustrating a luminaire including a power supply for lighting according to a second embodiment.

FIG. 5 is a circuit diagram illustrating a luminaire including a power supply for lighting according to a second embodiment.

In a power supply for lighting 3a according to this embodiment, a current control circuit 11a is provided instead of the current control circuit 11 in the power supply for lighting 3 according to the first embodiment. Components other than the current control circuit 11a of the power supply for lighting 3a in a luminaire 1a according to this embodiment are the same as the components of the luminaire 1.

In the current control circuit 11a, a switching element 23a is provided instead of the switching element 23 in the current control circuit 11 and a resistor 41 and a Zener diode 42 are added. Components of the current control circuit 11a other than these components are the same as the components of the current control circuit 11.

The switching element 23a is, for example, an FET and, for example, a GaN-HEMT and a normally-off type element. A drain of the switching element 23a is connected to the cathode of the rectifying element 21 and the cathode of the rectifying element 22. A source of the switching element 23a is connected to the low-potential terminal 9d of the rectifying circuit 9 via the detecting circuit 24. A gate (a control terminal) of the switching element 23a is connected to the high-potential terminal 9c of the rectifying circuit 9. The resistor 41 and the Zener diode 42 are connected between a gate of the switching element 23a and the low-potential terminal 9d of the rectifying circuit 9.

The direct-current voltage VRE of the smoothing capacitor 10 is supplied to the gate of the switching element 23a. Therefore, even when the switching element 23a is the normally-off type element, the switching element 23a can be turned on when the polarity of the alternating-current voltage VCT is reversed. As a result, in this embodiment, it is possible to obtain effects same as the effects of the first embodiment.

Third Embodiment

Figure 6:
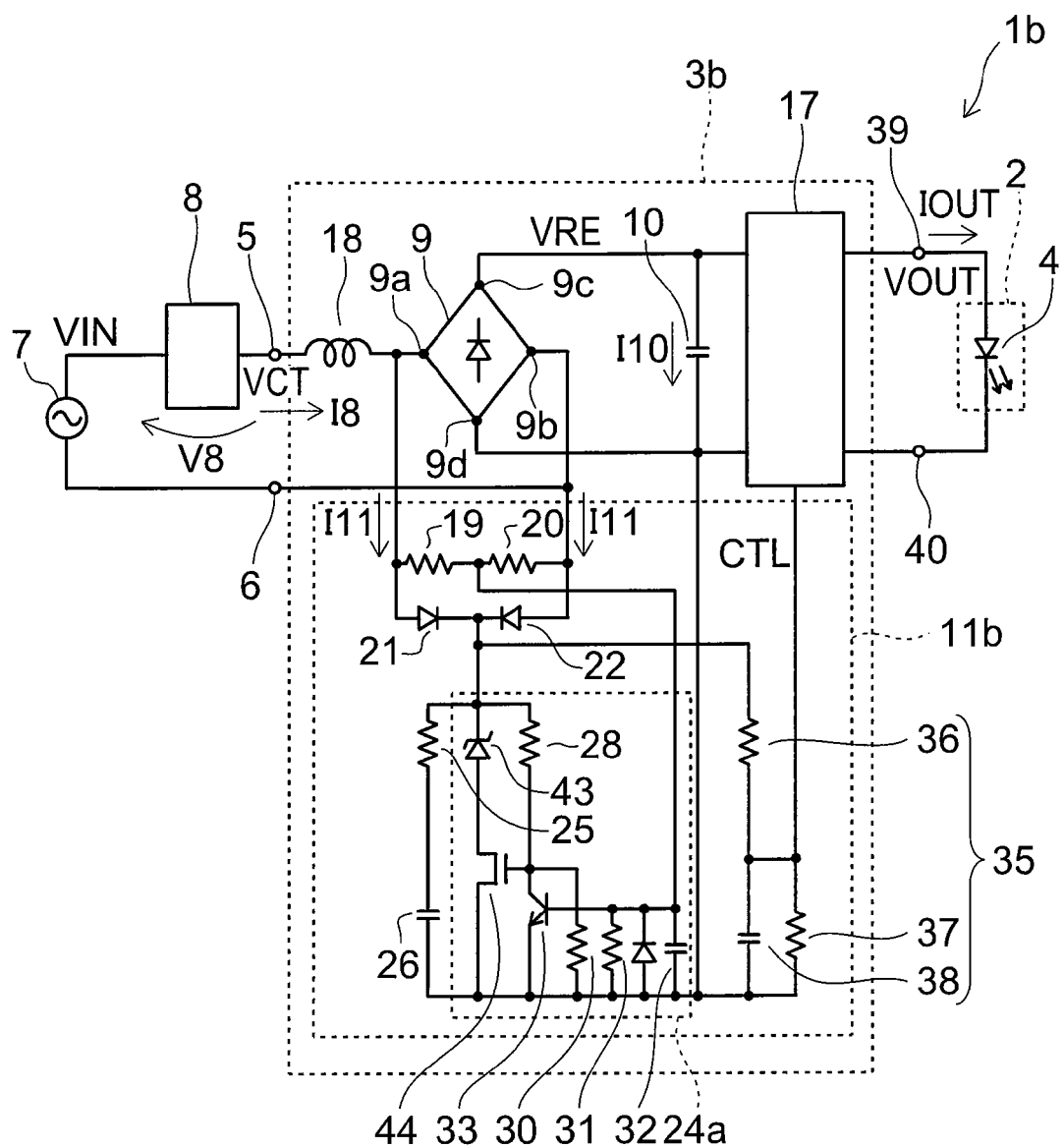
FIG. 6 is a circuit diagram illustrating a luminaire including a power supply for lighting according to a third embodiment.

FIG. 6 is a circuit diagram illustrating a luminaire including a power supply for lighting according to a third embodiment.

In a power supply for lighting 3b according to this embodiment, a current control circuit 11b is provided instead of the current control circuit 11 in the power supply for lighting 3 according to the first embodiment. Components other than the current control circuit 11b of the power supply for lighting 3b in a luminaire 1b according to this embodiment are the same as the components of the luminaire 1.

In the current control circuit 11b, the switching element 23 in the current control circuit 11 is not provided and a detecting circuit 24a is provided instead of the detecting circuit 24. Components of the current control circuit 11b other than these components are the same as the components of the current control circuit 11.

In the detecting circuit 24a, a Zener diode 43 and a transistor 44 are respectively provided instead of the resistor 29 and the transistor 34 in the detecting circuit 24.

The transistor 44 is, for example, a MOSFET and is a normally-off type element.

The operation of the power supply for lighting 3b is explained.

When an absolute value of the alternating-current voltage VCT input to the input terminals 5 and 6 of the power supply for lighting 3b is smaller than the specified value, in the period of the shut-off state of the dimmer 8, the base voltage of the transistor 33 is lower than the forward direction voltage between the base and the emitter of the transistor 33. As a result, the transistor 33 is off. Since the transistor 33 is off, the transistor 44 is biased by the resistor 28 and the resistor 30 and turned on. As a result, the first electric current flows to the current control circuit 11b through a path of the Zener diode 43 and the transistor 34.

The input current I8 having magnitude equal to the magnitude of the first electric current flows to the power supply for lighting 3b.

The charging capacitor 26 is charged via the charging resistor 25. However, the transistor 44 remains in the ON state and the first electric current flows through the Zener diode 43.

Subsequently, when the dimmer 8 conducts, the impedance of the dimmer 8 drops below the input impedance of the power supply for lighting 3b and the voltage V8 at both the ends of the dimmer 8 drops to nearly zero. At this point, the alternating-current voltage VCT input to the input terminals 5 and 6 of the power supply for lighting 3b is substantially equal to the power supply voltage VIN.

The absolute value of the alternating-current voltage VCT input to the input terminals 5 and 6 of the power supply for lighting 3b increases to be equal to or larger than the specified value and the cathode side voltage of the Zener diode suddenly rises. The base-to-emitter voltage of the transistor 33 of the detecting circuit 24a rises and the transistor 33 is turned on. As a result, the base-to-emitter voltage of the transistor 34 drops and the transistor 34 is turned off.

The charging capacitor 26 is charged by the second electric current via the charging resistor 25. The second electric current for charging the charging capacitor 26 flows as a pulse current. Since the transistor 33 is on, even after the second electric current finishes flowing, an electric current flows via the resistor 28 until the alternating-current voltage VCT crosses zero and the polarity is reversed. The resistance of the resistor 28 is set relatively large. The electric current flowing via the resistor 28 is set smaller than the second electric current and set smaller than a current value for turning on the triac 12 in the dimmer 8 again.

In the power supply for lighting 3b according to this embodiment, since the switching elements 23 and 23a are not used, it is possible to obtain, with a simple configuration, effects same as the effects of the power supply for lighting 3 according to the first embodiment In the power supply for lighting 3b, even after the second electric current flows in a pulse shape, an electric current smaller than the second electric current flows. However, since the electric current is smaller than the electric current for turning on the triac 12 in the dimmer 8 again, it is possible to keep the output voltage of the dimmer 8 stable.

The embodiments are explained above with reference to the specific examples. However, the present invention is not limited to the embodiments and various modifications are possible.

For example, in the detecting circuit 24, the Zener diode 43 and the transistor 44 in the detecting circuit 24a may be provided instead of the resistor 29 and the transistor 34. In the detecting circuit 24a, the resistor 29 and the transistor 34 in the detecting circuit 24 may be provided instead of the Zener diode 43 and the transistor 44.

The switching elements 23 and 23a are not limited to the GaN-HEMT. The switching elements 23 and 23a may be, for example, a semiconductor element formed by using a semiconductor having a wideband gap (a wide band gap semiconductor) such as silicon carbide (SiC), gallium nitride (GaN), or diamond in a semiconductor substrate. The wideband gap semiconductor means a semiconductor having a band gap wider than a band gap of about 1.4 eV of gallium arsenide (GaAs). For example, the semiconductor having the band gap equal to or larger than 1.5 eV includes gallium phosphide (GaP, having a band gap of about 2.3 eV), gallium nitride (GaN, having a band gap of about 3.4 eV), diamond (C, having a band gap of about 5.27 eV), aluminum nitride (AlN, having a band gap of about 5.9 eV), and silicon carbide (SiC). When withstanding pressure is set the same, such a wideband gap semiconductor element can be set smaller than a silicon semiconductor element. Therefore, it is possible to reduce the size of a power supply for lighting.

The illumination light source 4 is not limited to the LED and may be an EL, an OLED, or the like. Plural illumination light sources 4 may be connected to the lighting load 2 in series or in parallel.

While certain embodiments have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the inventions.

What is claimed is:

1. A power supply for lighting comprising:
    a rectifying circuit configured to rectify a phase-controlled alternating-current voltage supplied between a pair of input terminals;
    a smoothing capacitor connected to high-potential and low-potential terminals of the rectifying circuit; and
    a current control circuit connected to the pair of input terminals, a first electric current flowing to the current control circuit in a period when an absolute value of the alternating-current voltage is lower than a specified value and, after a second electric current larger than the first electric current flows when the absolute value of the alternating-current voltage increases to be equal or larger than the specified value, the current control circuit being shut off to reduce a current value to be smaller than the second electric current until the absolute value of the alternating-current voltage decreases to be lower than the specified value.

2. The power supply according to claim 1, wherein the current control circuit includes:
    a detecting circuit connected between the pair of input terminals and the low-potential terminal of the rectifying circuit and configured to be symmetrical to the pair of input terminals and detect the alternating-current voltage; and
    a pair of rectifying elements connected to the pair of input terminals.

3. The power supply according to claim 2, wherein the current control circuit further includes:
    a charging resistor connected between the rectifying elements and the low-potential terminal of the rectifying circuit; and
    a charging capacitor connected between the charging resistor and the low-potential terminal of the rectifying circuit and charged by the second electric current.

4. The power supply according to claim 3, wherein the current control circuit further includes a switching element connected between the pair of rectifying elements and the low-potential terminal of the rectifying circuit.

5. The power supply according to claim 4, wherein the switching element is a normally-on type switching element.

6. The power supply according to claim 4, wherein the switching element is a normally-off type switching element, and a voltage of the smoothing capacitor is supplied to a control terminal of the switching element.

7. The power supply according to claim 2, wherein the current control circuit includes:
    a charging resistor connected between the switching element and the low-potential terminal of the rectifying circuit; and
    a charging capacitor connected between the charging resistor and the low-potential terminal of the rectifying circuit and charged by the second electric current.

8. The power supply according to claim 2, wherein the current control circuit generates a reference voltage on the basis of a voltage of the rectifying elements.

9. The power supply according to claim 8, further comprising a direct-current power supply circuit configured to generate an output voltage on the basis of the reference voltage.

10. The power supply according to claim 1, further comprising a dimmer configured to phase-control the alternating-current voltage.

11. The power supply according to claim 10, wherein the first electric current has a current value for reducing the phase-controlled alternating-current voltage to be smaller than a voltage at both ends of the dimmer when the dimmer is in a shut-off state.

12. The power supply according to claim 10, wherein the second electric current is larger than a current value for changing the dimmer to a conduction state.

13. The power supply according to claim 10, wherein, after the second electric current flows, the current control circuit is shut off to reduce a current value to be smaller than an electric current for causing the dimmer to conduct until the absolute value of the alternating-current voltage decreases to be smaller than the specified value.

14. The power supply according to claim 1, wherein the second electric current is a pulse current.

15. A luminaire comprising:
    a lighting load; and
    a power supply for lighting configured to supply electric current to the lighting load, wherein the power supply for lighting includes:
    a rectifying circuit configured to rectify a phase-controlled alternating-current voltage supplied between a pair of input terminals;
    a smoothing capacitor connected to high-potential and low-potential terminals of the rectifying circuit; and
    a current control circuit connected to the pair of input terminals, a first electric current flowing to the current control circuit in a period when an absolute value of the alternating-current voltage is lower than a specified value and, after a second electric current larger than the first electric current flows when the absolute value of the alternating-current voltage increases to be equal or larger than the specified value, the current control circuit being shut off to reduce a current value to be smaller than the second electric current until the absolute value of the alternating-current voltage decreases to be lower than the specified value.

* * * * *